US012184016B2

(12) United States Patent
Mandel et al.

(10) Patent No.: US 12,184,016 B2
(45) Date of Patent: Dec. 31, 2024

(54) CONTACT DEVICE, IN PARTICULAR A COAXIAL CONTACT DEVICE

(71) Applicant: TE Connectivity Germany GmbH, Bensheim (DE)

(72) Inventors: Christian Mandel, Bensheim (DE); Samir Aboulkassem, Bensheim (DE); Christian Schrettlinger, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 93 days.

(21) Appl. No.: 17/576,421

(22) Filed: Jan. 14, 2022

(65) Prior Publication Data

US 2022/0231470 A1 Jul. 21, 2022

(30) Foreign Application Priority Data

Jan. 15, 2021 (DE) ....................... 102021100807.07

(51) Int. Cl.
*H01R 24/44* (2011.01)
*H01R 13/6581* (2011.01)
(Continued)

(52) U.S. Cl.
CPC ......... *H01R 24/44* (2013.01); *H01R 13/6581* (2013.01); *H01R 13/6582* (2013.01);
(Continued)

(58) Field of Classification Search
CPC ................ H01R 24/44; H01R 13/6581; H01R 13/6582; H01R 24/40; H01R 24/54;
(Continued)

(56) References Cited

U.S. PATENT DOCUMENTS 4,360,244 A * 11/1982 Forney, Jr. ............. H01R 24/50 439/582
8,647,128 B2 2/2014 Sykes et al.
(Continued)

FOREIGN PATENT DOCUMENTS

CN 105703101 A 6/2016
CN 111541086 A 8/2020
(Continued)

OTHER PUBLICATIONS

Chinese Office Action dated Jul. 26, 2023 with English translation, corresponding to Application No. 202210030623.8, 16 pages.

*Primary Examiner* — Justin M Kratt
(74) *Attorney, Agent, or Firm* — Barley Snyder

(57) ABSTRACT

A contact device includes a first contact element extending along a straight line and a second contact element inclined with respect to the first contact element. The first contact element has a connecting body extending along the straight line, a first contact portion, and a flap. The first contact portion has a first contact socket. The flap is connected to a first fixed end at a first side of the connecting body. The first contact portion is connected to the connecting body. The flap extends along the first straight line to the first contact portion and a free end of the flap is arranged at a distance from the first contact portion. The second contact element has a second contact portion engaging the first contact socket and electrically contacting the first contact portion.

21 Claims, 7 Drawing Sheets

Fig. 1

(51) Int. Cl.

| | |
|---|---|
| ***H01R 13/6582*** | (2011.01) |
| ***H01R 24/40*** | (2011.01) |
| ***H01R 24/54*** | (2011.01) |
| *H01R 4/48* | (2006.01) |
| *H01R 13/02* | (2006.01) |
| *H01R 13/10* | (2006.01) |
| *H01R 13/646* | (2011.01) |
| *H01R 13/6473* | (2011.01) |
| *H01R 13/6474* | (2011.01) |
| *H01R 13/6476* | (2011.01) |
| *H01R 24/42* | (2011.01) |
| *H01R 103/00* | (2006.01) |

(52) U.S. Cl.

CPC ............. *H01R 24/40* (2013.01); *H01R 24/54* (2013.01); *H01R 4/48* (2013.01); *H01R 13/02* (2013.01); *H01R 13/10* (2013.01); *H01R 13/646* (2013.01); *H01R 13/6473* (2013.01); *H01R 13/6474* (2013.01); *H01R 13/6476* (2013.01); *H01R 24/42* (2013.01); *H01R 2103/00* (2013.01)

(58) Field of Classification Search

CPC ...... H01R 13/02; H01R 13/10; H01R 13/646; H01R 13/6473; H01R 13/6474; H01R 13/6476; H01R 24/42; H01R 2103/00; H01R 4/48

See application file for complete search history.

(56) References Cited

U.S. PATENT DOCUMENTS

| | | | | |
|---|---|---|---|---|
| 9,634,411 | B2 | 4/2017 | Brand | |
| 11,158,974 | B2 | 10/2021 | Architekt et al. | |
| 2009/0035990 | A1 | 2/2009 | McCarthy | |
| 2011/0104910 | A1 | 5/2011 | Kadomatsu et al. | |
| 2013/0157503 | A1* | 6/2013 | Sykes | H01R 24/44 439/578 |
| 2014/0030905 | A1 | 1/2014 | Phillips et al. | |
| 2015/0222062 | A1 | 8/2015 | Sloey | |

FOREIGN PATENT DOCUMENTS

| | | | | | |
|---|---|---|---|---|---|
| GB | 1109373 | A | | 4/1968 | |
| JP | S54158292 | U | * | 11/1979 | |
| WO | WO-2007098617 | A1 | * | 9/2007 | H01R 13/111 |

* cited by examiner

CONTACT DEVICE, IN PARTICULAR A COAXIAL CONTACT DEVICE

CROSS-REFERENCE TO RELATED APPLICATIONS

This application claims the benefit of the filing date under 35 U.S.C. § 119(a)-(d) of German Patent Application No. 102021100807.7, filed on Jan. 15, 2021.

FIELD OF THE INVENTION

The present invention relates to a contact device and, more particularly, to a coaxial contact device.

BACKGROUND

A coaxial contact device is known from U.S. Pat. No. 8,647,128 B2. The coaxial contact device has a first contact element and a second contact element. The second contact element has a recess in which a pin-shaped portion of a first contact element engages in order to form an electrical contact between the first contact element and the second contact element.

SUMMARY

A contact device includes a first contact element extending along a straight line and a second contact element inclined with respect to the first contact element. The first contact element has a connecting body extending along the straight line, a first contact portion, and a flap. The first contact portion has a first contact socket. The flap is connected to a first fixed end at a first side of the connecting body. The first contact portion is connected to the connecting body. The flap extends along the first straight line to the first contact portion and a free end of the flap is arranged at a distance from the first contact portion. The second contact element has a second contact portion engaging the first contact socket and electrically contacting the first contact portion.

BRIEF DESCRIPTION OF THE DRAWINGS

The invention will now be described by way of example with reference to the accompanying Figures, of which.

DETAILED DESCRIPTION OF THE EMBODIMENT(S)

Reference is made below in FIGS. 1 to 7 to a system of coordinates. The system of coordinates has an x-axis (longitudinal direction), a y-axis (transverse direction) and a z-axis (height). The system of coordinates is formed by way of example as a right-handed trihedron.

Figure 1:
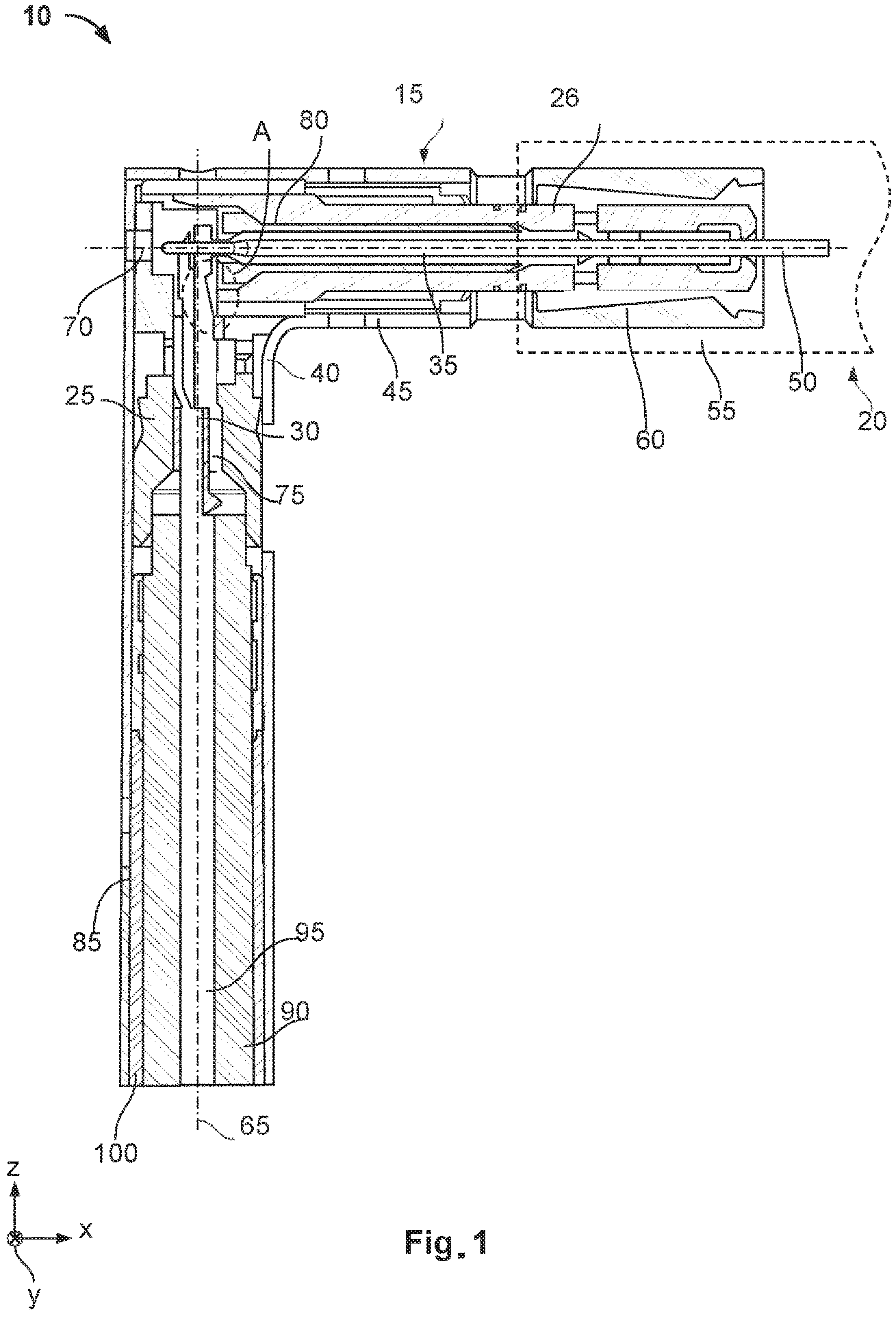
FIG. 1 is a sectional side view of a contact system.

FIG. 1 shows a semi-longitudinal section through a contact system 10. The contact system 10 has a first contact device 15 and a second contact device 20. The first contact device 15 is designed as an angled plug connector in the embodiment. The second contact device 20 is designed so that it runs in a straight line relative to the x-axis. The second contact device 20 can also be designed as a second angled plug connector.

As shown in FIG. 1, the first contact device 15 has a first insert part 25, a second insert part 26, a first contact element 30, a second contact element 35, a first shielding contact 40, and a second shielding contact 45. The second contact device 20 has a mating contact 50, a shielding mating contact 55, and a third insert part 60.

The first contact element 30 extends in its main direction of extent along a first straight line 65 which runs parallel to the z-axis. The second contact element 35 extends in its main direction of extent along a second straight line 70. The second straight line 70 is oriented inclined with respect to the first straight line 65. The second straight line 70 is arranged in FIG. 1 by way of example at a 90° angle to the first straight line 65. The second straight line 70 extends by way of example in a longitudinal direction parallel to the x-axis.

The first insert part 25 has a first insert socket 75 and the second insert part 26 has a second insert socket 80, as shown in FIG. 1. The first insert socket 75 extends along the first straight line 65. The first insert socket 75 is open via an opening 85 on a side remote from the second contact socket 80. The first insert socket 75 and the second insert socket 80 open into each other on a side remote from the opening 85. The first straight line 65 and the second straight line 70 intersect in a joining region of the first insert socket 75 and the second insert socket 80.

The first insert part 25 engages through the first shielding contact 40 which extends along the first straight line 65. The first shielding contact 40 is here electrically insulated relative to the first contact element 30 by the first insert part 25. The first contact element 30 is arranged in the first insert socket 75 of the first insert part 25. The second contact element 35 is arranged in the second insert socket 80 of the second insert part 26. The second contact element 35 here engages through the second shielding contact 45.

The second shielding contact 45 extends in the same way as the second contact element 35 along the second straight line 70, wherein the second shielding contact 45 engages around the periphery of the second insert part 26, as shown in FIG. 1. The second shielding contact 45 is electrically insulated relative to the second contact element 35 by the second insert part 26. The second contact element 35 is arranged in the second insert part 26. The first shielding contact 40 and the second shielding contact 45 are connected to each other. The first shielding contact 40 and the second shielding contact 45 can form a housing of the first contact device 15.

In the assembled state of the contact system 10, the mating contact 50 is also oriented so that it runs in its main direction of extent along the second straight line 70. The mating contact 50 here mechanically and electrically contacts the second contact element 35 on a side remote from the first contact element 30. The shielding mating contact 55 also mechanically and electrically contacts the second shielding contact 45. In the assembled state, the second contact element 35 is thus connected electrically to the mating contact 50 and the second shielding contact 45 is connected electrically to the shielding mating contact 55.

A data line, in particular a coaxial cable, leads into the first contact device 15 on a side remote from the second contact element 35 via the opening 85, as shown in FIG. 1. The data cable 90 is designed to transmit data signals with a frequency of up to 10 GHz, for example within a range of 2 GHz to 10 GHz. The data cable 90 has a data conductor 95 and a shield 100, wherein the data signal is transmitted via the data conductor 95. The shield 100 is arranged coaxially around the data conductor 95 in order to shield the data conductor 95 relative to the environment. The data conductor 95 is electrically insulated relative to the shield 100.

The data conductor 95 is connected electrically to the first contact element 30 on a side remote from the second contact element 35. The shield 100 is connected electrically to the first shielding contact 40 on a side remote from the second contact element 35. The first shielding contact 40 contacts the second shielding contact 45. The first shielding contact 45 and the second shielding contact 45 shield the first contact element 30 and the second contact element 35 relative to the environment.

Figure 2:
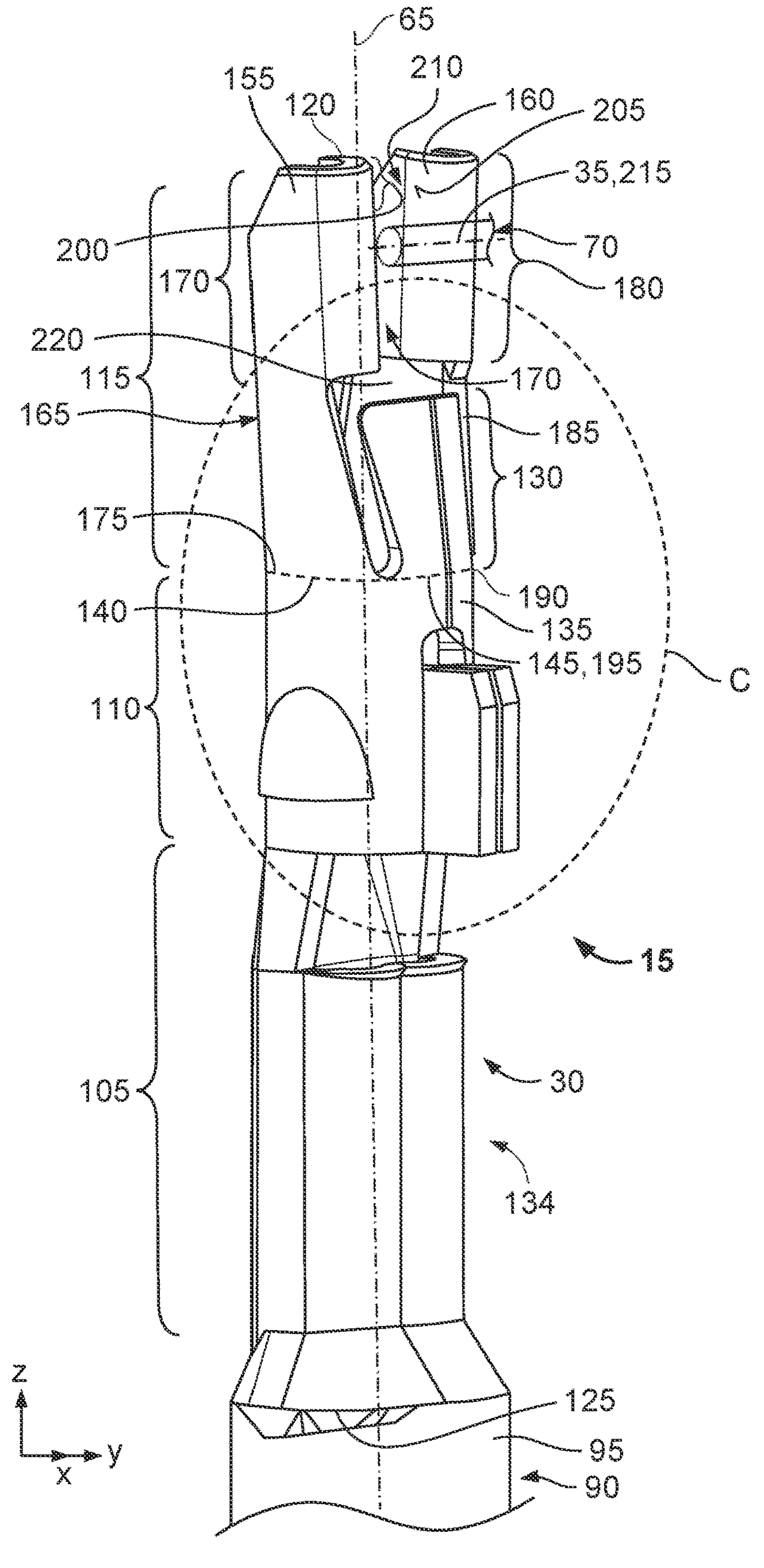
FIG. 2 is a perspective view of a first contact element of a first contact device of the contact system of FIG. 1.

FIG. 2 shows a perspective view of the first contact element 30 of the first contact device 15. The first contact element 30 has a connection portion 105, an intermediate portion 110, a flap 130, and a first contact portion 115. The first contact portion 115 adjoins a first axial end 120 of the first contact element 30 relative to the first straight line 65. The connection portion 105 is arranged opposite the first contact portion 115 relative to the first straight line 65 and adjoins a second axial end 125 of the first contact element 30.

The intermediate portion 110, as shown in FIG. 2, extends essentially in the z direction between the first contact portion 115 and the connection portion 105. The intermediate portion 110 mechanically and electrically connects the connection portion 105 to the first contact portion 115. The connection portion 105 can be crimped electrically and mechanically, for example by a crimped connection 134, to the data conductor 95 of the data cable 90. A different connection, in particular a welded connection or a soldered connection, between the connection portion 105 and the data conductor 95 could also be possible.

The intermediate portion 110 has a connecting body 135, as shown in FIG. 2. The connecting body 135 is designed in the embodiment in the manner of a hollow body, for example a hollow cylindrical one, running around the first straight line 65 in the peripheral direction. The first straight line 65 is here arranged so that it runs centrally relative to the connecting body 135. In particular, the first straight line 65 is hereby an axis of rotation about which the connecting body 135 extends. The connecting body 135 is connected on a first side 140 to the first contact portion 115 and to a first fixed end 145 of the flap 130. On the opposite side relative to the first straight line 65, the connecting body 135 is connected mechanically and electrically to the connection portion 105.

The first contact portion 115 extends in the peripheral direction relative to the first straight line 65 next to the flap 130, between the first side 140 of the connecting body 135 which is arranged at the top of the connecting body 135 in FIG. 2 and the first axial end 120. The first contact portion 115 has a first contact tongue 155 and a second contact tongue 160. The first contact tongue 155 has a first spring portion 165 and a first contact region 170 connected to the first spring portion 165, wherein the first contact region 170 substantially adjoins the first axial end 120 of the first contact portion 115. The flap 130 at least partially fills a region between the first contact tongue 155 and the second contact tongue 160 such that the first contact element 30 has a particularly good high-frequency behavior.

The first spring portion 165 is designed as a beam spring and the first contact tongue 155 is connected to the first side 140 of the connecting body 135 by a second fixed end 175. The second contact tongue 160 is arranged transversely opposite relative to the first contact tongue 155.

The second contact tongue 160 is designed, by way of example, mirror-symmetrically with respect to a plane of symmetry within which the first straight line 65 runs. The second contact tongue 160 has a second spring portion 185 and a second contact region 180 connected to the second contact tongue 160, as shown in FIG. 2. The second spring portion 185 is connected to the first side 140 of the connecting body 135 by a third fixed end 190. The second contact region 180 is arranged so that it adjoins the first axial end 120. The second spring portion 185, which is designed as a beam spring, here connects the second contact region 180 to the third fixed end 190 and the first side 140 of the connecting body 135.

In the peripheral direction, the first fixed end 145 of the flap 130, the second fixed end 175 of the first contact tongue 155, and the third fixed end 190 of the second contact tongue 160 run on a common circular path 195 about the first straight line 65. The first fixed end 145 of the flap 130 is here arranged between the second fixed end 175 and the third fixed end 190 in the peripheral direction relative to the first straight line 65.

The first contact region 170 has a first contact surface 200 transversely on a side facing the second contact region 180, as shown in FIG. 2. The first contact surface 200 can be designed, in an embodiment, so that it runs substantially flat. The second contact region 180 has a second contact surface 205 opposite it transversely. The second contact surface 205 faces the first contact surface 200 and can also be designed to be flat like the first contact surface 200. The first contact surface 200 and the second contact surface 205 here transversely delimit a first contact socket 210. The first contact socket 210 can widen the greater the distance from the first side 140 of the connecting body 135 towards the first axial end 120. The first contact socket 210 is designed so that it is open in the longitudinal direction.

In the assembled state of the first contact device 15, the second contact element 35 shown in FIG. 2 engages in the first contact socket 210 with a pin-shaped second contact portion 215. The second contact portion 215 extends, for example, substantially along the second straight line 70. In the assembled state, the first spring portion 165 and the second spring portion 185 are pre-tensioned and press the respective associated first and second contact surface 200, 205 against the second contact portion 215 at the periphery such that a reliable electrical contact between the first contact element 30 and the second contact element 35 is ensured.

In the assembled state, the first contact tongue 155 and the second contact tongue 160 are pivoted outwards, relative to a rest position, about the y-axis. Because the first spring portion 165 and the second spring portion 185 are formed so that they run semi-annularly on the common circular path 195, the first spring portion 165 and the second spring portion 185 can provide a particularly high pressing force for pressing the respective associated first and second contact surface 200, 205 against the second contact portion 215.

Figure 3:
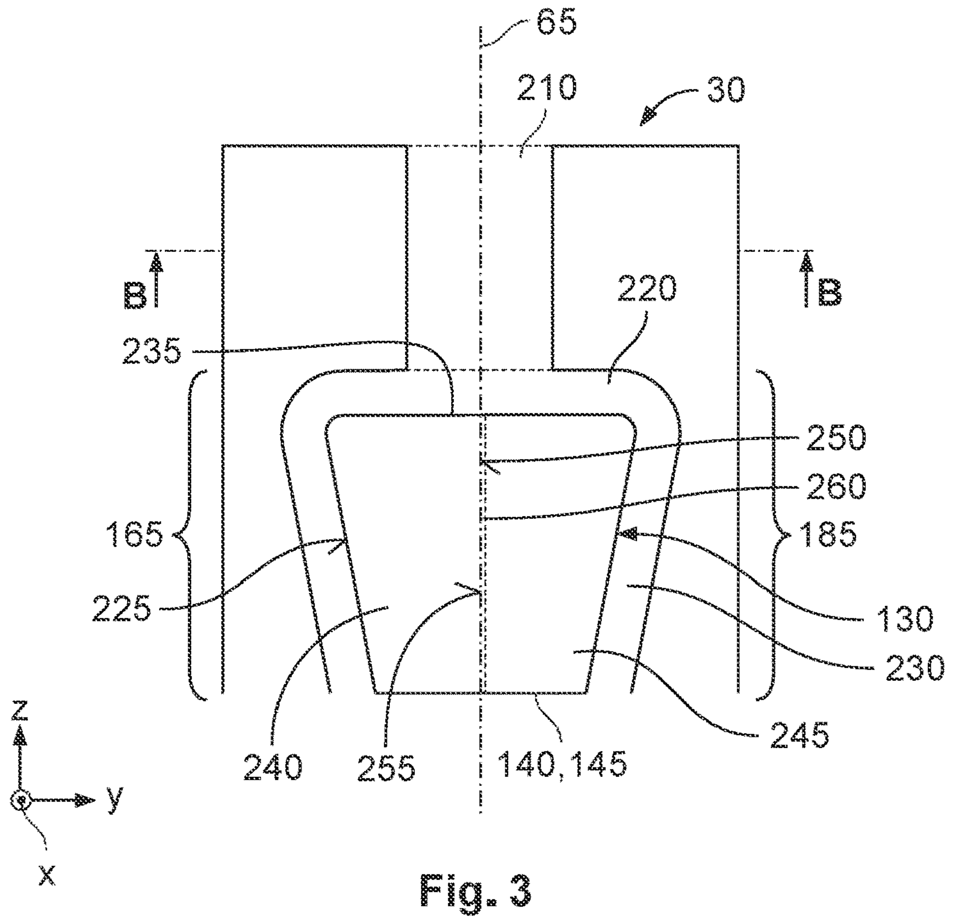
FIG. 3 is a side view of the first contact element of FIG. 2.

FIG. 3 shows a side view of the first contact element 30 shown in FIG. 2. In the direction of the first straight line 65, the extent of the first spring portion 165 and/or the second spring portion 185 decreases in the peripheral direction the greater the distance from the first side 140, such that the spring portion 165, 185 tapers the greater the distance from the first side 140. The first spring portion 165 forms, together with the second spring portion 185, a first socket 220 in the peripheral direction relative to the first straight line 65, wherein the flap 130 is arranged in the first socket 220.

As shown in FIG. 3, the flap 130 widens in the peripheral direction the greater the distance from the first side 140 of the connecting body 135 in the peripheral direction relative to the first straight line 65. The flap 130 has an outer contour 225 which, in a side view, is designed to be V-shaped or trapezoidal. The first socket 220 is designed to be larger than the outer contour 225 of the flap 130. As a result, a first gap 230 extends between the flap 130 and the first spring portion 165, and the flap 130 and second spring portion 185.

The flap 130 extends along the first straight line 65 from the first fixed end 145 to a free end 235, as shown in FIG. 3. The flap 130 extends semi-annularly around the first straight line 65. The flap 130 could also be designed as a plate. The free end 235 is arranged height-wise between the first contact socket 210 and the first fixed end 140. At the free end 235, the flap 130 is essentially widest in the peripheral direction. The first gap 230 leads around the flap 130 with essentially the same width in such a way that the first and second contact region 170, 180 are also arranged at a distance from the free end 235. The first gap 230 opens into the first contact socket 210. When the contact tongue 155 is pivoted, in particular in the spring region, the first contact tongue 155 does not rub against the flap 130 and consequently a reliable mounting of the second contact portion 215 in the first contact socket 210 is ensured.

In an embodiment shown by way of example in FIG. 3, the flap 130 is configured in two parts. The flap 130 here has a first flap part 240 and a second flap part 245, arranged next to the first flap part 240 in the peripheral direction. In the embodiment, the first flap part 240 and the second flap part 245 are arranged, by way of example, mirror-symmetrically with respect to the plane of symmetry. The first flap part 240 here has a first abutment surface 250 on a side facing the second flap part 245, and the second flap part 245 has a second abutment surface 255 on a side facing the first flap part 240. In the assembled state of the first contact device 15, the first abutment surface 250, in an embodiment, bears against the second abutment surface 255. A second gap 260 can also (as indicated in FIG. 3 by a dashed line) be arranged between the first abutment surface 250 and the second abutment surface 255, wherein the second gap 260 essentially has a constant width in the z direction.

Figure 4:
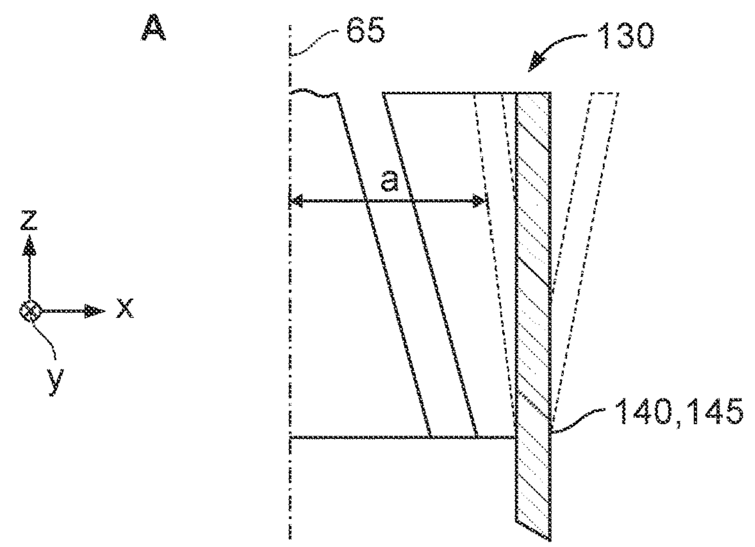
FIG. 4 is a detail view A of FIG. 1.

FIG. 4 shows a detail A, marked in FIG. 1, of the view in section shown in FIG. 1. The flap 130 is, in the shown embodiment, oriented so that it runs parallel to the first straight line 65. The flap 130 can also, as indicated by a dashed line in FIG. 4, be arranged inclined inwards towards the first straight line 65. A distance a between the flap 130 and the first straight line 65 here decreases the greater the axial distance of the flap 130 from the first fixed end 145 of the flap 130. Alternatively, the flap 130 could also be formed so that it is inclined outwards. The distance a between the flap 130 and the first straight line 65 here decreases the greater the axial distance of the flap 130 from the first fixed end 145 relative to the first straight line 65 (shown in dot and dash line in FIG. 4).

Figure 5:
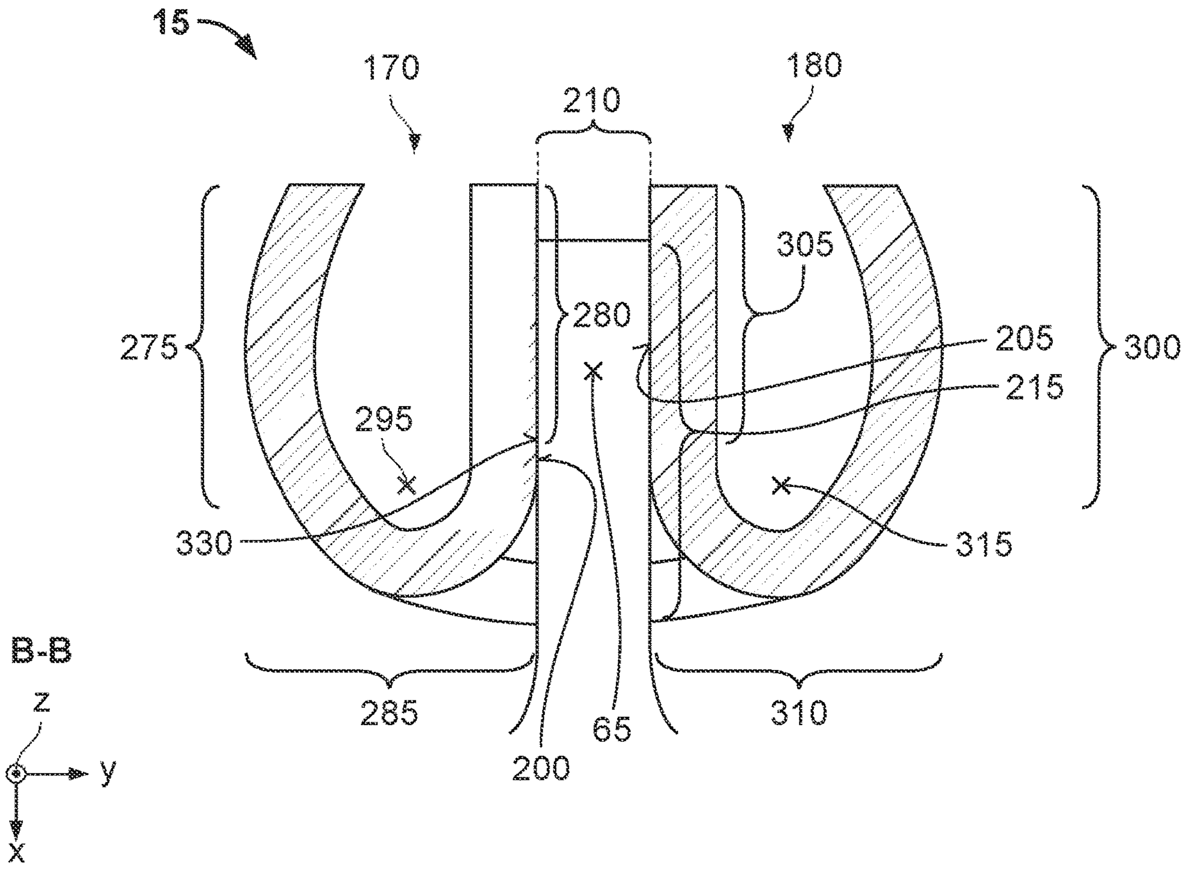
FIG. 5 is a sectional view of the first contact device taken along a plane B-B of FIG. 3.

FIG. 5 shows a view in section along a plane of section B-B, shown in FIG. 3, through the first contact device 15 shown in FIG. 3. The first contact region 170 and the second contact region 180 are each designed with multiple layers. The first contact region 170 here has, by way of example, a first layer 275, a second layer 280 and a first curved portion 285. The first layer 275 is arranged on a side remote from the first contact socket 210 and hence on the outside of the first contact socket 210. The second layer 280 is arranged on the inside and hence on a side facing the first contact socket 210. The second layer 280 has the first contact surface 200 delimiting the first contact socket 210 in the y direction.

The first layer 275 is connected to the second layer 280 by the first curved portion 285, as shown in FIG. 5. The second layer 280 is designed essentially as a plate. The first layer 275 is formed so that it is curved in an arched shape. The first layer 275 and the second layer 280 are arranged so that they are spaced apart from each other in the y direction. The first layer 275 can also be formed as a plate. The second layer 280 can also be formed so that it is curved, in particular in an arched shape. The first contact region 170 is here connected to the first spring portion 165 on a side facing away from the viewer in FIG. 5 of the first contact region 170 on the first layer 275. The first curved portion 285 and the second layer 280 are connected to the first spring portion 165 only via the first layer 275 and have no direct connection to the first spring portion 165.

The first curved portion 285 is designed so that it is curved, for example in an arched shape, so that it runs in particular semi-annularly, essentially 180° around a first bending axis 295. The first bending axis 295 can be configured so that it runs essentially parallel to the first straight line 65. As part of the production, the second layer 280 and the first curved portion 285 are formed from a plate-like material by bending the first curved portion 285 about the first bending axis 295 such that, as can be seen in FIG. 5, the first contact region 170 has a U-shaped configuration essentially in the plane of section B-B.

In an embodiment, the first curved portion 185 is arranged on a side facing the second insert socket 80 and the second contact element 35 arranged therein. In other words, a space between the first layer 275 and the second layer 280 is accessible and open only from a longitudinal side (in the x direction) remote from the second contact element 35.

The second contact region 180 is designed essentially identically to the first contact region 170. The second contact region 180 here, as shown in FIG. 5, has a third layer 300, a fourth layer 305 and a second curved portion 310, wherein the second curved portion 310 connects the third layer 300 to the fourth layer 305. The fourth layer 305 is also designed as a plate, whilst in contrast the second curved portion 310 is formed, in an embodiment, in an arched shape, in particular semi-annularly, so that it runs essentially 180° around a second bending axis 315. The third layer 300 can be formed so that it is curved, in particular curved in an arched shape. The fourth layer 305 could also likewise be formed so that it is curved, in particular in an arched shape. The third layer 300 could moreover be configured as a plate.

As shown in FIG. 5, the second curved portion 310 is arranged on that side of the third layer 300 and the fourth layer 305 which faces the second insert socket 80 and the second contact element 35 arranged therein in the longitudinal direction. The third and fourth layer 300, 305 are arranged spaced apart in the transverse direction. In the z direction, only the third layer 300 is connected to the second spring portion 185 on a side facing away from the viewer in FIG. 5. The second curved portion 310 and the fourth layer 305 are mechanically connected to the second spring portion 185 only indirectly via the third layer 300. The fourth layer 305 has the second contact surface 205 on the side facing the first contact socket 210, wherein the second contact surface 205, situated opposite the first contact surface 200 in the y direction, delimits the first contact socket 210.

The second contact portion 215 has a third contact surface 330 arranged on the periphery, as shown in FIG. 5. The third contact surface 330 can be designed, for example, cylindrically. The third contact surface 330 is contacted on both sides by the first contact portion 115. The first and second contact surface 200, 205, situated opposite the second contact surface 205 in the y direction, here bear against the third contact surface 330. A particularly good electrical contact is consequently ensured between the first contact element 30 and the second contact element 35 for the purpose of transmitting signals with data information.

Moreover, catching of the second contact portion 215 when it is pushed in the x direction into the first contact portion 115 is prevented by the first and second curved portion 285, 310 arranged on a side facing the second insert socket 80 and the second contact element 35. The first and second curved portion 285, 310 thus serve, by virtue of their curved design, as a guide for pushing the second contact portion 215 into the first contact socket 210.

Moreover, by virtue of the two-layer design, shown by way of example in the embodiment, of the first and second contact region 170, 180, an electrical capacity of the first contact element 30 is increased compared with an electrical capacity of the first contact element 30 without a multi-layer design of the contact region 170, 180. The two-layer design, shown in FIG. 5, of the contact region 170, 180 is of course not limited to precisely two layers 275, 280, 300, 305 respectively and instead it is also possible for there to be a different number of layers 275, 280, 300, 305, in particular more than two, per contact region 170, 180. The capacity of the first contact element 30 can be structurally adjusted to a desired value by the number of layers 275, 280, 300, 305. The first contact element 30 is moreover designed particularly favorably from a mechanical point of view. Burr-free pushing of the second contact portion 215 into the first contact socket 210 can furthermore be ensured.

Figure 6:
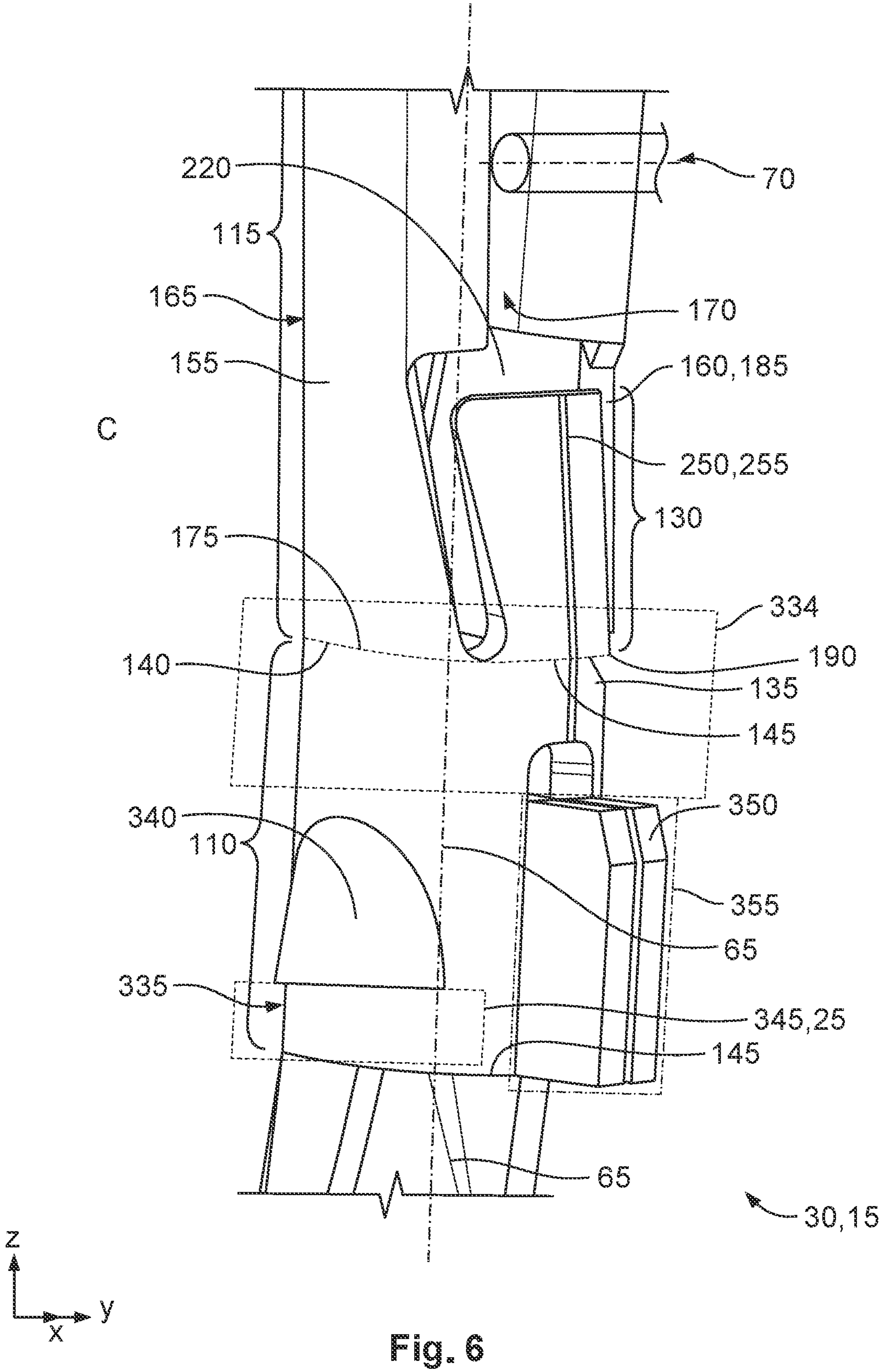
FIG. 6 is a detail view C of the first contact element of FIG. 2.

FIG. 6 shows an enlarged detail C of the first contact element 30 shown in FIG. 2. The first fixed end 145 of the flap 130 and the second fixed end 175 of the first contact tongue 155 and the third fixed end 190 of the second contact tongue 160 can be arranged by way of example in a common plane 334 which is formed by way of example as an xy plane. The plane 334 is arranged by way of example perpendicular to the first straight line 65. As a result, it is ensured that the contact tongues 155, 160, in particular the first and second spring portion 165, 185, press against the first and second contact surface 200, 205 on the second contact portion 215 with essentially the same pressing force. Tilting of the second contact element 35 in the contact socket 210 is consequently prevented. In the embodiment, the flap 130 and the first and second curved portion 285, 310 are arranged on a common side facing the second contact element 35.

The intermediate portion 110 can moreover have a latching device 335, for example a latching lug 340 as shown in FIG. 6. The latching lug 340 is arranged so that it is offset with respect to the flap 130 in the peripheral direction relative to the first straight line 65. The latching device 335 can, for example, have two latching lugs 340 arranged opposite each other in the y direction, wherein, by way of example, each of the two latching lugs 340 is arranged offset by in each case, for example, 90° to the abutment surface 250, 255. In the assembled state of the first contact element 30 in the first insert part 25, the latching lug 340 is designed by way of example to engage behind a projection 345 of the first insert part 25 (the projection 345 is indicated schematically in dashed lines in FIG. 6) in the first insert socket 75 in such a way that an axial position of the first contact element 30 is secured in the first insert part 25 in the z direction/along the first straight line 65, and undesired disengagement and removal of the first contact element 30 from the first insert part 25 via the opening 85 is prevented. This arrangement, offset in the peripheral direction, of the flap 130 with respect to the latching device 335 has the advantage that catching of the flap 130 on the projection 345 of the first insert part 25 is prevented when the first contact element 30 is pushed in.

The intermediate portion 110 can moreover have a guide element 350, as shown in FIG. 6. The guide element 350 is designed as a plate and extends in its main direction of extent essentially within a yz plane in which the first straight line 65 is arranged. The guide element 350 is here oriented parallel to the first straight line 65. The guide element 350 can, for example, have a two-layer design and extends radially outwards in a radial direction relative to the first straight line 65 from the connecting body 135. The guide element 350 here protrudes beyond an outer peripheral side of the connecting body 135. In the assembled state of the first contact element 30 in the first insert socket 75, the guide element 350 engages into a second socket 355 designed as a slot which corresponds to the guide element 350 (indicated in dashed lines in FIG. 6).

Orientation of the first contact element 30 in the peripheral direction relative to the first straight line 65 is fixed in a defined fashion with respect to the first insert part 25 by the guide element 350. In the embodiment, the guide element 350 and the flap 130 are oriented essentially identically. As a result, the guide element 350 and the abutment surface 250, 255 are arranged in a common yz plane. The guide element 350 can also have a two-layer design as shown in FIG. 6 in order to produce the guide element 350 particularly simply and such that the guide element 350 is particularly robust from a mechanical point of view.

The first contact element 30 can be produced as a single piece and from the same material by a stamping and bending process. A blank of the first contact element 30 can here be stamped from a flat piece of sheet metal. In at least one bending step, the first contact element 30 is formed from the blank in such a way that, on the one hand, the guide element 350 and the contact regions 170, 180 have a multi-layer design and, on the other hand, are arranged at least opposite the abutment surface 250, 255 of the flap 130 in the transverse direction with an essentially constant gap width of the second gap 260 and/or preferably bear against the abutment surfaces 250, 255.

Alternatively, the flap 130 can also be arranged and designed such that it is designed as a single piece and continuously. The second gap 260 can be avoided as a result. Moreover, the abutment surfaces 250, 255 can be dispensed with.

Figure 7:
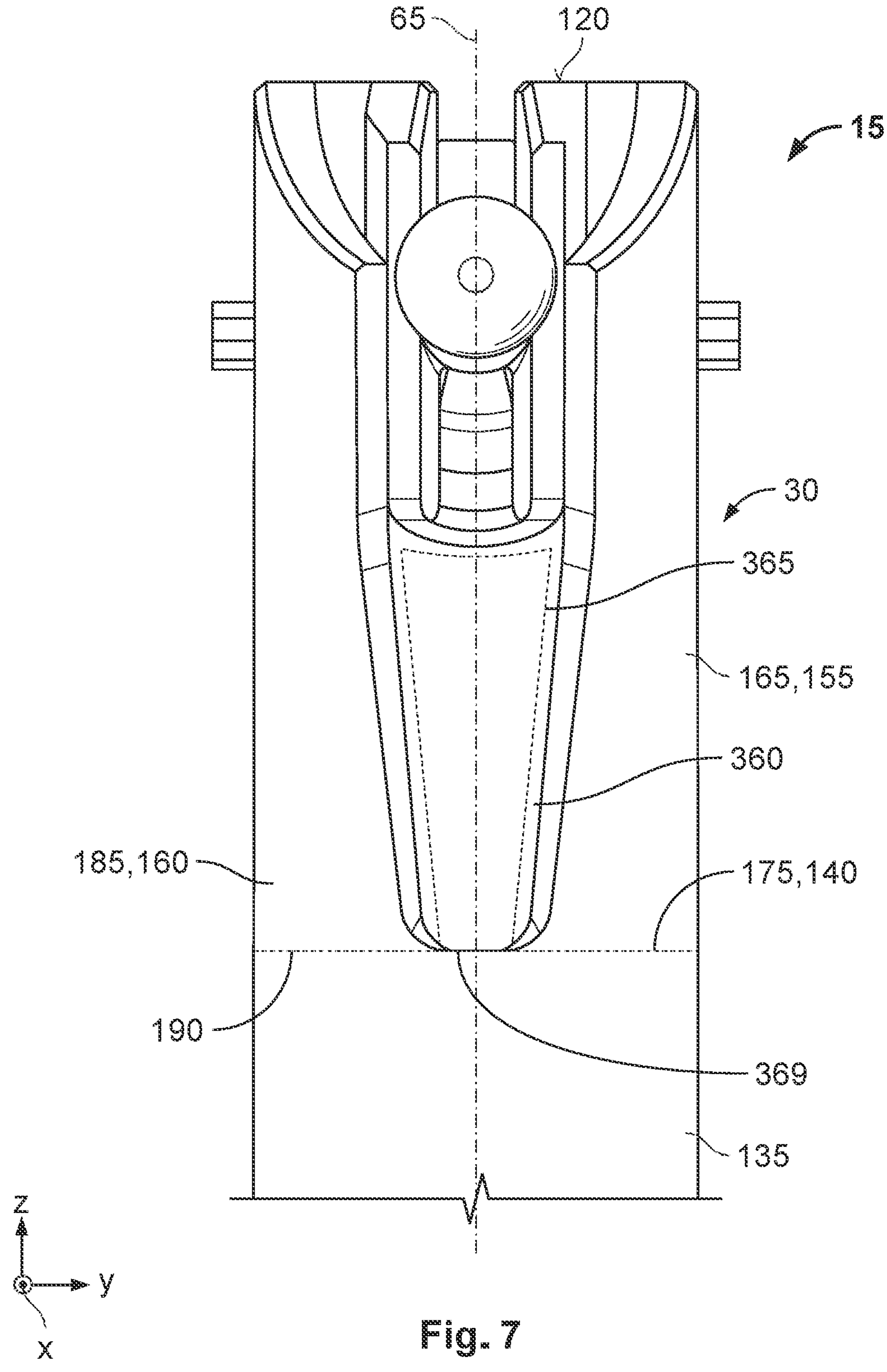
FIG. 7 is another sectional view of the first contact element.

FIG. 7 shows a further side view of the first contact element 30, shown in FIGS. 2 to 6, of the first contact device 15. The first spring portion 165 and the second spring portion 185 here have a width in the peripheral direction relative to the first straight line 65 such that, at the second fixed end 175 of the first contact tongue 155 and the third fixed end 190 of the second contact tongue 160 on that side of the flap 130 which is remote in the peripheral direction, they are arranged on the first side 140 with a small spacing and so that they abut each other. A third gap 360 here extends in an axial direction between the first axial end 120 and the first side 140 of the connecting body 135. The third gap 360 is designed so that it tapers in the peripheral direction from the first axial end 120 towards the first side 140 of the connecting body 135. In the embodiment, the arrangement of a further flap 365 is dispensed with.

A further flap 365 could of course also be arranged in the third flap 360 in order to increase the electrical capacity of the first contact element 30 (indicated in dashed lines in FIG. 7). In an embodiment, if the first spring portion 165 and/or the second spring portion 185 is designed so that it is narrower in the peripheral direction than shown in FIG. 7, there is hereby sufficient structural space in the third gap 360 to arrange the further flap 365 in the third gap 360. It would of course also be possible to dispense with the flap 130 if the further flap 365 is provided. The further flap 365 can be fastened at a fourth fixed end 369 on the first side 140 of the connecting body 135. The further flap 365 can be designed so that it corresponds to the flap 130 such that what has been explained for the flap 130 also applies for the further flap 365.

Figure 8:
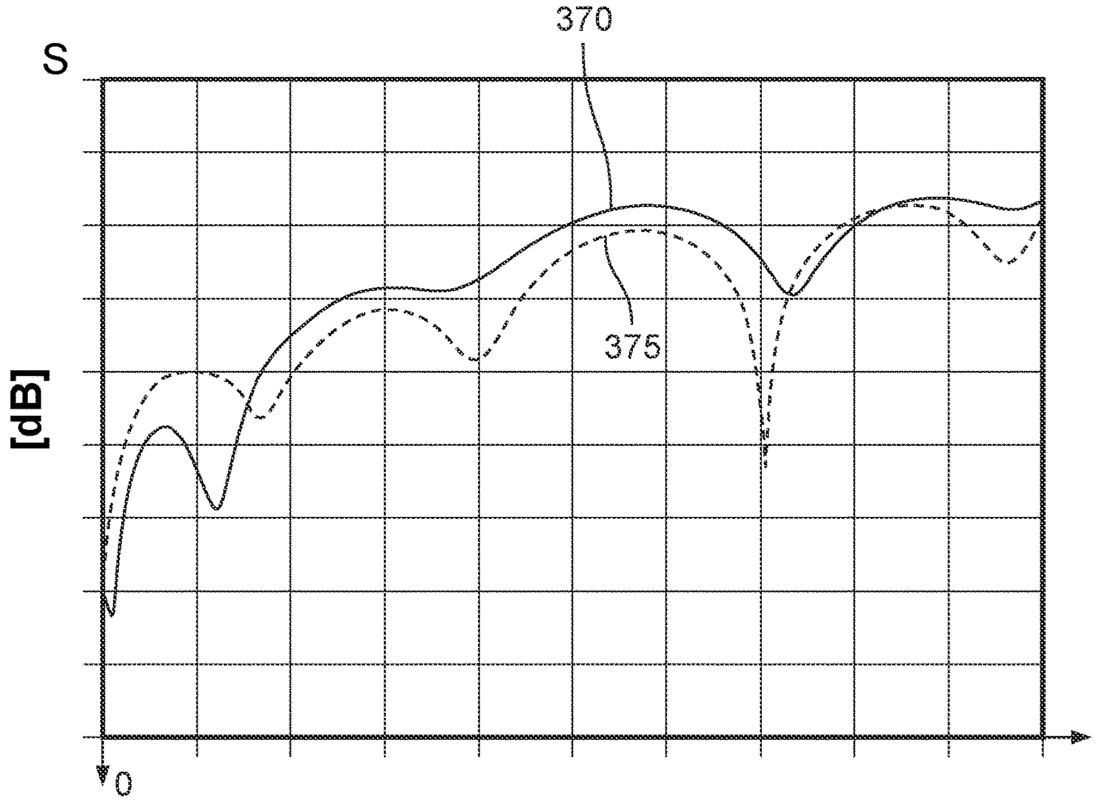
FIG. 8 is a graph of a dispersion parameter plotted against a frequency of a data signal transmitted via the first contact device.

FIG. 8 shows a diagram of a dispersion parameter S in dB plotted against a frequency f of the data signal transmitted via the first contact device 15. As already explained, when the contact system 10 is operating, a data signal is transmitted with a frequency f of 2 GHz to 10 GHz.

A first graph 370 and a second graph 375 are illustrated in FIG. 8. The first graph 370 corresponds to a plot of the dispersion parameter S against the frequency f for the first contact element 30 shown in FIGS. 1 to 7 but without the flap 130. The second graph 375 shows a plot of the dispersion parameter S against the frequency f for the first contact element 30 (with the flap 130) shown in FIGS. 1 to 7. It can be seen here that the second graph 375 runs below the first graph 370 over large parts of the frequency spectrum of the frequency f, for example from 2 GHz to 10 GHz, and therefore has a better dispersion parameter S in dB over the frequency f than the first contact element 30 without a flap 130. Only at low frequencies f (for example, less than 1.5 GHz) does the first contact element 30 without the flap 130 (cf the first graph 370) have a better behavior of the dispersion parameter S than the first contact element 30 with the flap 130, shown in FIGS. 1 to 7. However, the deterioration at low frequencies fin the range from 0 GHz to 1.5 GHz should be viewed positively and the slight deterioration at low frequencies of a very good value accepted in order to increase the overall performance of the first contact device 15 and in order to obtain an overall balanced performance.

Figure 9:
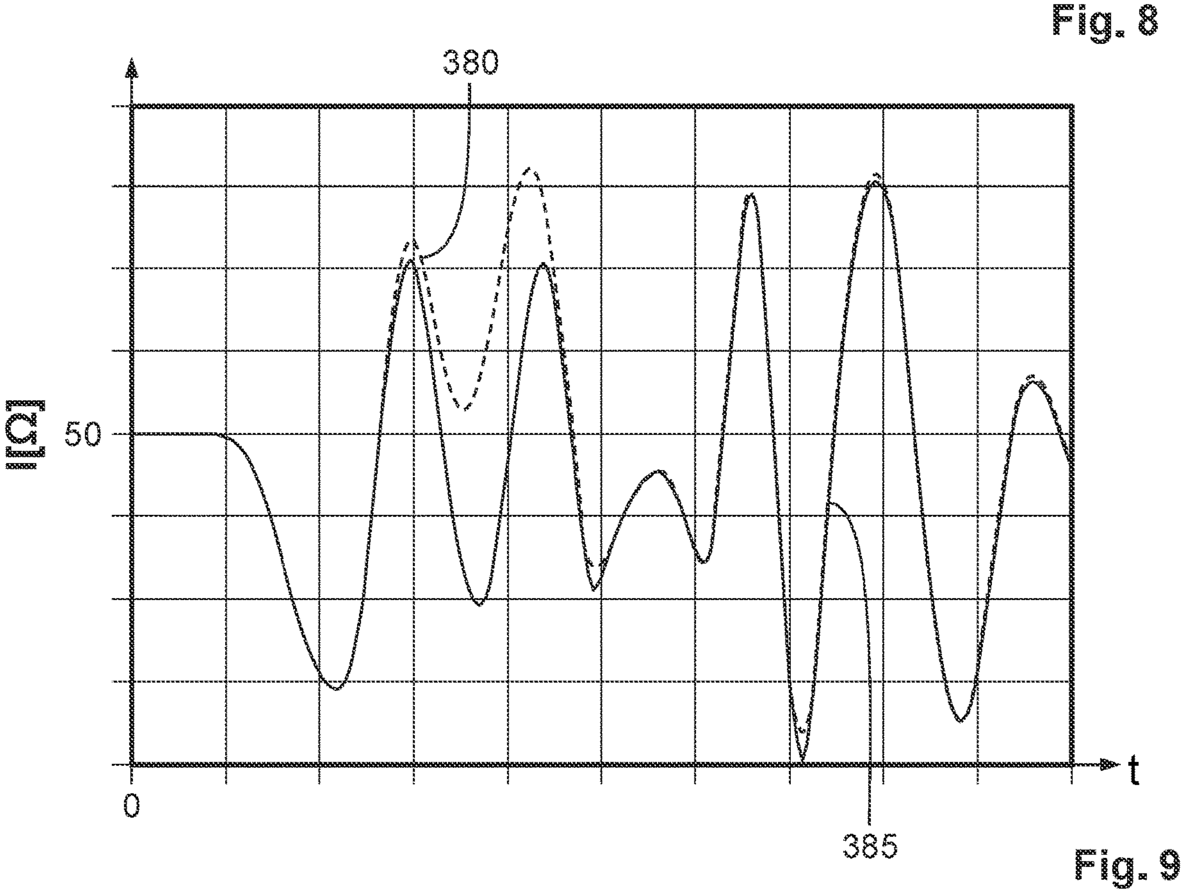
FIG. 9 is a graph of a time domain reflectometry measurement plotted against a time pulse of a data signal transmitted via the first contact device.

FIG. 9 shows a diagram of a time domain reflectometry (TDR) measurement. In FIG. 9, the reflection of the first contact element 30 and a subsequent mating plug connector is plotted against time t as impedance. A third graph 380 and a fourth graph 385 are illustrated here in FIG. 9. The third graph 380 corresponds to a time domain reflectometry of the first contact element 30 without a flap 130 and the fourth graph 385 shows the plot of the time domain reflectometry of the contact element 30 shown in FIGS. 1 to 7. It can also be seen in FIG. 9 that the first contact element 30 shown in FIGS. 1 to 7 also has an improved behavior in the time domain reflectometry compared with the first contact element 30 without a flap 130 (cf third graph 380).

In the present invention, no changes in the capacity occur when the second contact element 35 is inserted into the first contact socket 210. In particular, owing to the arrangement of the flap 130 on the connecting body 135, the geometry of the flap 130 is not changed, for example widened, when the second contact portion 215 is inserted into the first contact portion 115. As a result, stable and reliable high-frequency behavior, in particular in a frequency range of 2 GHz to 10 GHz, is ensured for signal transmission.

What is claimed is:

1. A contact device, comprising:

a first contact element extending along a first straight line, the first contact element having a connecting body extending along the first straight line, a first contact portion, and a flap, the first contact portion has a first contact socket, the flap is connected to a first fixed end at a first side of the connecting body, the first contact portion is connected to the connecting body, the flap extends along the first straight line to the first contact portion and a free end of the flap is arranged at a distance from the first contact portion, the flap has a first flap part and a second flap part arranged in a peripheral direction next to the first flap part relative to the first straight line, the first flap part has a first abutment surface on a side facing the second flap part and the second flap part has a second abutment surface on a side facing the first flap part, a second gap extends between the first abutment surface and the second abutment surface and/or the first abutment surface and the second abutment surface bear against each other; and a second contact element arranged inclined with respect to the first contact element, the second contact element has a second contact portion engaging the first contact socket and electrically contacting the first contact portion.

2. A contact device, comprising:

a first contact element extending along a first straight line, the first contact element having a connecting body extending along the first straight line, a first contact portion, and a flap, the first contact portion has a first contact socket, the flap is connected to a first fixed end at a first side of the connecting body, the first contact portion is connected to the connecting body, the flap extends along the first straight line to the first contact portion and a free end of the flap is arranged at a distance from the first contact portion, the first contact element has a guide element oriented parallel to the first straight line, the guide element and the flap are arranged within a common plane with the first straight line; and a second contact element arranged inclined with respect to the first contact element, the second contact element has a second contact portion engaging the first contact socket and electrically contacting the first contact portion.

3. The contact device of claim 2, wherein the guide element is a plate.

4. The contact device of claim 2, wherein the first contact portion has a first contact tongue extending along the first straight line and a second contact tongue extending along the first straight line, the first contact tongue and the second contact tongue are arranged opposite each other and delimit the first contact socket.

5. The contact device of claim 4, wherein the first contact tongue and the second contact tongue bear on both sides of the second contact portion.

6. The contact device of claim 5, wherein the first contact tongue is connected to the connecting body with a second fixed end and the second contact tongue is connected to the connecting body with a third fixed end, the flap is arranged between the second fixed end of the first contact tongue and the third fixed end of the second contact tongue, in a peripheral direction relative to the first straight line.

7. The contact device of claim 6, wherein the first fixed end of the flap and the second fixed end of the first contact tongue and/or the third fixed end of the second contact tongue are arranged within a common plane perpendicular to the first straight line.

8. The contact device of claim 6, wherein the first contact tongue has a first spring portion and a first contact region, the first spring portion adjoins the second fixed end of the first contact tongue and is a beam spring, the first contact region adjoins the first spring portion on a side remote from the second fixed end and extends along the first straight line.

9. The contact device of claim 8, wherein the first contact region has a first layer and a second layer, the first layer is arranged on an outside of the first contact socket and is connected to the first spring portion, the second layer is arranged on an inside of the first contact socket, the first curved portion connecting the first layer to the second layer.

10. The contact device of claim 9, wherein the first layer and/or the second layer is a plate or is curved in an arched shape, the first curved portion is arched and arranged on a side of the first layer and/or the second layer facing the second contact element.

11. The contact device of claim 4, wherein a first gap is arranged laterally between the flap and the first contact tongue, the first gap extends between the first fixed end and the free end of the flap.

12. The contact device of claim 11, wherein the first gap has a same width at the first fixed end and the free end.

13. The contact device of claim 4, wherein the first contact tongue has a first curved portion that is bent about a first bending axis that extends along the first straight line.

14. The contact device of claim 2, wherein the flap tapers from the free end toward the first fixed end.

15. The contact device of claim 2, wherein the flap has a first flap part and a second flap part arranged in a peripheral direction next to the first flap part relative to the first straight line.

16. The contact device of claim 15, wherein the first flap part has a first abutment surface on a side facing the second flap part and the second flap part has a second abutment surface on a side facing the first flap part, a second gap extends between the first abutment surface and the second abutment surface and/or the first abutment surface and the second abutment surface bear against each other.

17. The contact device of claim 2, further comprising a latching device arranged on the connecting body, the flap is arranged offset with respect to the latching device in a peripheral direction relative to the first straight line.

18. The contact device of claim 17, wherein the latching device is a latching lug.

19. The contact device of claim 2, wherein the flap is oriented parallel or inclined with respect to the first straight line, the first straight line runs centrally with respect to the connecting body.

20. The contact device of claim 2, further comprising a first insert part having a first insert socket, the first insert socket extends along the first straight line and the flap is arranged at a distance from an inner peripheral surface of the first insert socket.

21. The contact device of claim 2, wherein the contact device is a coaxial contact device with a first shielding contact through which the first contact element engages, the first shielding contact is electrically insulated relative to the first contact element.

* * * * *